United States Patent [19]

Schiefer et al.

[11] Patent Number: 5,735,653
[45] Date of Patent: Apr. 7, 1998

[54] ANCHOR ROD FOR COMPOSITE ANCHORS

[75] Inventors: Erwin Schiefer, München; Franz Popp, Buchloe, both of Germany

[73] Assignee: Hilti Aktiengesellschaft, Schaan

[21] Appl. No.: 806,817

[22] Filed: Feb. 26, 1997

[30] Foreign Application Priority Data

Mar. 7, 1996 [DE] Germany ............... 196 08 859.3

[51] Int. Cl.⁶ ............... F16B 39/00; F16B 39/02; F21D 20/00
[52] U.S. Cl. ............... 411/82; 411/258; 411/389; 411/413; 405/259.6
[58] Field of Search ............... 411/82, 258, 263, 411/307, 308, 389, 413, 415; 405/259.5, 259.6

[56] References Cited

U.S. PATENT DOCUMENTS

| | | |
|---|---|---|
| 4,518,290 | 5/1985 | Frichmann. |
| 4,564,315 | 1/1986 | Rozanc. |
| 4,642,964 | 2/1987 | Kellison. |
| 4,854,311 | 8/1989 | Steffer ............... 411/413 X |
| 5,049,015 | 9/1991 | Sawaide et al. ............... 411/82 |
| 5,263,804 | 11/1993 | Ernst et al. ............... 411/82 |
| 5,562,672 | 10/1996 | Hurgner et al. ............... 411/307 |

FOREIGN PATENT DOCUMENTS 4137090 5/1993 Germany.

OTHER PUBLICATIONS

European Search Report, NO. EP 97 810 019.6 dated Jun. 18, 1997.

*Primary Examiner*—Neill R. Wilson
*Attorney, Agent, or Firm*—Anderson, Kill & Olick, P.C.

[57] ABSTRACT

An anchor rod for use as a composite anchor is secured in a receiving borehole by one of a hardenable or curable organic and inorganic mortar mass. The anchor rod has a means (3) at a trailing end region (2) for engaging a load. The anchor rod has an anchoring region (4) insertable into the receiving borehole and has a thread-like profiling (5) for interaction with the mortar mass injected into the receiving borehole. The thread-like profiling is a coarse screw thread (5) and has a thread pitch (s) which reduces in the axial direction from the leading end toward the trailing end of the anchor rod (1).

8 Claims, 1 Drawing Sheet

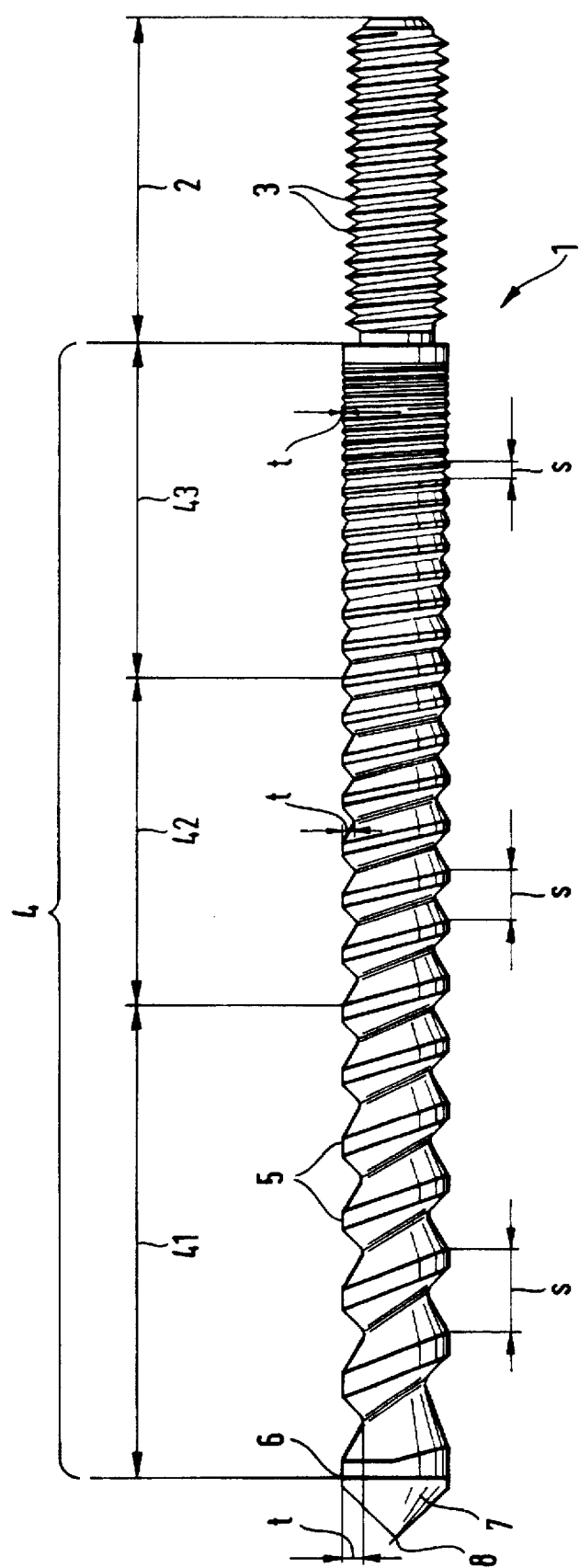

ANCHOR ROD FOR COMPOSITE ANCHORS

BACKGROUND OF THE INVENTION

The present invention is directed to an anchor rod for composite anchors fastened in a receiving borehole in an anchorage base material by at least one of a curable or hardenable organic and inorganic mass. The anchor rod is an axially extending rod having an axially extending anchoring region with thread-like profiling on its outer surface arranged to interact with the mortar mass injected in the borehole.

Two anchoring methods have been successful in the formation of largely expansion pressure free anchorages. In one method, an anchor with radially outwardly displaceable sections is positioned in an undercut at the base of a receiving borehole. The displaceable sections are pivoted outwardly in the region of an undercut in the borehole and hold the anchor axially by a positive lock with the undercut. This method is relatively expensive. Initially, the receiving borehole must be drilled and subsequently an undercut produced by a special tool at a predetermined depth in the borehole. Only after such preparations, can the anchor rod be placed in the receiving borehole. The radially outward displacement of the retaining sections is effected by axially pulling in or pressing out of a cone-shaped member. The method is largely free of expansion pressure depending on the angle of the borehole wall at the transition into the undercut.

A second method for the formation of expansion pressure free anchorages involves securing an anchor rod by means of a curable or hardenable organic and/or inorganic mortar mass in the receiving borehole. Accordingly, after the receiving borehole is drilled, the mortar mass is injected into the borehole. As a rule, such mortar masses are multi-component systems with components reacting with one another and additives which must be stored separately from one another. The reaction is triggered only when the components make contact and are mixed with one another in the receiving borehole. The components of the mortar mass to be reacted with one another are held separately from one another in glass ampoules or containers or in bags and are pushed into the receiving borehole. The containing members are broken open by the subsequent insertion of an anchor rod, so that the components come into contact with one another. It is important for the effectiveness of the mortar mass and for attaining extraction volumes as high as possible, that the components of the mortar mass are mixed intimately with one another. Accordingly, the anchor rod is usually rotated about its axis while it is inserted into the receiving borehole. A thread-like profiling on the anchoring region of the anchor rod is intended to improve the intermixing of the mortar mass components.

While as a rule an adequate intermixing of the components can be achieved with known shaped anchor rods, it is still desirable to improve the intermixing of the components. The components of the mortar mass are not intended to be left at the base of the receiving borehole in a unmixed state. At the same time, the mortar mass should be prevented from escaping out of the borehole during the mixing operation. The components of the mortar mass should be concentrated in the anchoring region of the anchor rod and be thoroughly intermixed in that region. The trailing end of the anchor rod, equipped with a means for engaging a load, such as an axially extending external thread, should remain free of the mortar mass. The securement of the anchor rod should be achieved in a single step without the need for any additional means.

SUMMARY OF THE INVENTION

Therefore, the primary object of the present invention is to overcome the partially contradictory tasks involved in securing the anchor rod and is effected by providing the anchoring region with a thread-like profiling formed of a coarse screw thread having thread pitches diminishing in the axial direction from the leading end towards the trailing end of the anchor rod.

In accordance with the present invention, an anchor rod for composite anchors is provided where the rod is secured in a receiving borehole by a hardenable organic and/or inorganic mortar mass and has at its trailing end means for a load. The anchoring region of the anchor rod, insertable into the receiving borehole, has a thread-like profiling which mixes the components of the organic and/or inorganic composite mortar mass introduced into the receiving borehole. The thread-like profiling is a coarse screw thread with thread pitches diminishing in the axial direction from the leading end towards the trailing end of the anchor rod.

In particular, the contradictory problems faced in such composite anchors are solved by the inventive arrangement of the thread-like profiling with the thread pitches diminishing from the leading end of the anchor rod towards the surface of the base material in which the borehole is formed. The mortar mass is distributed over the anchoring region of the anchor rod and the components of the mortar mass are intimately intermixed. As a result, the escape of the mortar mass from the receiving borehole is prevented and the mortar mass is concentrated in the anchoring region of the anchor rod.

The axially extending region of the anchor rod adjacent its leading end has a relatively large thread pitch for conveying and intermixing the components of the mortar mass. The thread pitch diminishes towards the trailing end region containing the means for engaging a load. The changes in the thread pitch towards a trailing end of the anchoring region creates a compression zone for the mortar mass preventing any unintended escape of the mass from the receiving borehole. This arrangement concentrates the mortar mass, as intended, in the anchoring region. The procedure for securing the anchor rod occurs in a single step by rotating the anchor rod as it is inserted into the receiving borehole. The rotation of the anchor rod about its axis is effected in a known manner with the help of a rotating drilling tool. Additional means, such as for sealing the entry into the receiving borehole at the surface of the base material, is not required.

In one embodiment of the invention, the thread pitch of the coarse screw thread diminishes or becomes smaller section by section along the axial extent of the anchoring region of the rod, that is, from the leading end towards the trailing end. In such embodiment, the anchor rod has several consecutive zones each with a uniform thread pitch. The zone with the largest thread pitch represents the conveying region. The zone with the smallest thread pitch, adjacent to the trailing end region forming the means for engaging a load, constitutes a compression region preventing escape of the mortar mass from the receiving borehole. At least one transition zone is located between the conveying region and the compression region. In the transition region the thread pitch is smaller than in the conveying region and larger than in the compression region.

In a preferred embodiment of the anchor rod, the thread pitch diminishes continuously from the leading end towards the trailing end region. In such an arrangement, different regions result, however, the transitions between the regions are not as sharply defined, rather they proceed progressively. The thread pitch of the coarse screw thread approaches zero in the compression region adjoining the trailing end region. Such an arrangement prevents the theoretical possibility of conveying the mortar mass from the trailing compression region.

The solution of the problems to which the invention is directed, is aided by the coarse screw thread having a radial thread depth diminishing from the leading end region of the anchor rod towards the trailing end region. The conveying and intermixing of the mortar mass components is assisted in the region of the larger radial thread depth. In the trailing compression region, the diminishing radial thread depth assists in the compression procedure and prevents the conveyance of the mortar mass towards the surface containing the opening into the receiving borehole.

The radial thread depth can diminish in axially extending sections or continuously. The section-wise reduction is advantageous, but not necessarily coupled with the section-wise reduction of the thread depth and assists in the formation of zones on the anchor rod for the intermixing of the components of the mortar mass. It is easier to fabricate an anchor rod where the radial depth diminishes continuously from the leading end toward the trailing end region and approaches zero in the compression region adjacent to the trailing end region. As is the case in the continuously diminishing thread depth, progressive transitions ensue between the individual zones. The radial thread depth approaching zero in the compression region, assures a reliable termination of the conveying action of the thread-like profiling.

It is advantageous for the destruction or breaking up of the containers holding the components of the mortar mass separately from one another, if the leading end of the anchor rod forms a head terminating in a pointed tip.

To prevent the anchor rod from bonding with the mortar mass, if necessary, to afford a re-expansion of the anchor rod in a crack just opening in the base material of the anchorage, the anchoring region of the anchor rod can be provided with a jacket or sleeve. Preferably, the jacket is a plastics material sleeve or a shrink down hose embracing the anchoring region of the anchor rod.

If the anchoring region of the anchor rod is enclosed by a jacket, the anchoring region on the jacket can be provided with a coarse screw thread extending toward its trailing end, however, for fabrication reasons it has been found to be expedient to provide the coarse thread only on the outer surface of the jacket. While relatively produced or expensive forming processes are needed to provide the profiling on the anchor rod itself, the coarse screw thread can be very easily fabricated in the plastics material jacket by mass production shaping processes, for instance, by injection molding of the jacket.

The various features of novelty which characterize the invention are pointed out with particularity in the claims annexed to and forming a part of this disclosure. For a better understanding of the invention, its operating advantages and specific objects attained by its use, reference should be had to the drawing and descriptive matter in which there are illustrated and described preferred embodiments of the invention.

BRIEF DESCRIPTION OF THE DRAWING

The drawing is an axially extending side view of an anchor rod embodying the present invention.

DETAILED DESCRIPTION OF THE INVENTION

In the drawing an axially extending anchor rod 1 is shown and has a leading end at the left-hand end and a trailing end at the right-hand end. The anchor rod 1 has an axially extending outside thread 3 in its trailing end region 2 serving as a means for engaging a load to the anchor rod. An axially extending anchoring region 4 of the anchor rod extends from the leading end to the trailing end region 2. The anchoring region has a thread-like profiling 5. The thread-like profiling 5 is a coarse screw thread with a saw tooth like contour. The anchoring region 4 has a leading end 6 with a head part 7 extending axially from the leading end 6 and terminating in a pointed tip 8. The pointed tip 8 serves for breaking up the glass containers or plastics material bags containing the components of the mortar mass as the anchor rod is rotated while being inserted into the receiving borehole in which the components of the mortar mass are positioned prior to the insertion of the anchor rod. The rotational insertion of the anchor rod effects the intermixing of the components.

The coarse screw threads 5 formed in the anchoring region 4 have a thread pitch s diminishing or becoming smaller from the leading end 6 to the trailing end region 2. The axial measurement of the thread pitch s is the spacing of adjacent substantially radially equal helical regions or turns. In the embodiment shown in the drawing, the thread pitches s of the coarse screw thread 5 are reduced continuously towards the trailing end region 2. It goes without saying, that the thread pitch s can be constant in axially extending sections or zones, where the zones which follow one another from the front end toward the trailing end of the anchor rod 1 have a smaller thread pitch. As illustrated in the drawing, the anchoring region 4 is divided into three different zones 41, 42, 43 with the thread pitches s diminishing along the axial extent of the anchor rod 1. The front zone 41 of the anchor rod 1 has the largest thread pitches s and forms a conveying region for the mortar mass. The trailing zone 43 of the anchor rod, adjacent to the trailing end region 2, forms a compression region for the mortar mass due to the slight thread pitches s which approach zero. The intermediate zone 42 of the anchoring region, between the zones 41 and 43, forms a transition region or zone. The largest thread pitch s amounts approximately to 0.8 of the diameter of the anchor rod in the anchoring region and the thread pitch s preferably drops to approximately 0 in the trailing end of the compression zone 43.

The depth t of the coarse screw thread 5 can be made constant along the entire coarse screw thread length. Preferably, the coarse screw thread 5 has a thread depth t which diminishes from the leading end 6 of the anchoring region 4 towards the trailing end region 2, as is shown in the drawing. The thread depth t can be constant along individual sections where the sections with a uniform thread depth coincide with the zones of uniform thread pitch s. The thread depth t can also be reduced continuously up to approximately 0 as indicated in the drawing. The largest thread depth t amounts approximately to 0.3 times the diameter of the anchor rod in the anchoring region.

The coarse screw thread 5 in the anchoring region 4 of the anchor rod 1 can be formed directly in the axially extending outer surface of the anchor rod 1. To enable a re-expansion in a crack opening up in the anchorage base material, the anchor rod can be provided with an axially enclosing jacket or sleeve preventing a bonding between the anchor rod 1 and the mortar mass. For this purpose, the anchor rod can be provided with a coating or the anchoring region can be enclosed in a sleeve or shrink down hose. The thread-like profiling in the outer surface of the anchor rod can be maintained. Preferably, the enclosing jacket is formed by an axially extending plastics material sleeve. In such an arrangement, the coarse screw thread can be formed only in the outside surface of the jacket formed by the plastics material sleeve which is slipped over the anchoring region of the anchor rod. In any case, the thread-like profile of the outer surfaces of the anchored rod is maintained.

What is claimed as new and desired to be protected by letters patent is set forth in the appended claims.

What is claimed is:

1. An anchor rod for use in a composite anchor where the anchor rod is inserted into a borehole in an anchorage base material containing at least one of an organic and inorganic mortar mass in the borehole, wherein the anchor rod comprises an axially extending rod having a leading end inserted first into the borehole and a trailing end, said rod has an axially extending anchoring region (4) with a thread-like profiling (5) extending axially from the leading end towards the trailing end on an outer surface thereof arranged to interact with the mortar mass in the borehole, means for engaging a load on a trailing end region (2) extending axially from the trailing end towards said anchoring region (4), said thread-like profiling (5) comprises a coarse screw thread having thread pitches (s) diminishing in the axial direction from said leading end to said trailing end region (2).

2. An anchor rod, as set forth in claim 1 wherein said thread pitches (s) of said coarse screw thread (5) diminish in sections extending one after the other in the axial direction of said anchor rod (1) towards the trailing end thereof.

3. An anchor rod, as set forth in claim 1, wherein said thread pitch (s) diminishes continuously from a leading end of said anchoring region to said trailing end region (2).

4. An anchor rod, as set forth in one of claims 1–3, wherein said thread pitch (s) of said coarse screw thread (5) in an axially extending zone adjacent to said trailing end region is approximately equal to 0.

5. An anchor rod, as set forth in one of claims 1–3, wherein said coarse screw thread (5) has a radial thread depth (t) diminishing from a leading end of said anchoring region towards said trailing end region (2).

6. An anchor rod, as set forth in claim 5, wherein said radial thread depth (t) diminishes in axially extending sections.

7. An anchor rod, as set forth in claim 5, wherein said radial thread depth (t) diminishes continuously from a leading end (6) of said anchoring region (4) towards said trailing end region (2) and is approximately equal to 0 in a zone (43) adjacent to the trailing end section (2).

8. An anchor rod, as set forth in one of claims 1–3, wherein said anchor rod has a head part (7) extending axially from a leading end (6) of said anchoring region (4) and said head part (7) has a pointed tip (8).

* * * * *

UNITED STATES PATENT AND TRADEMARK OFFICE
CERTIFICATEOF CORRECTION

PATENT NO.    : 5,735,653
DATED         : April 7, 1998
INVENTOR(S)   : Erwin Schiefer, et al It is certified that error appears in the above-identified patent and that said Letters Patent is hereby corrected as shown below:

On title page, item
[73] Assignee: Hilti Aktiengesellschaft, Schaan, Fürstentum Liechtenstein

Signed and Sealed this

Sixteenth Day of June, 1998

Attest:

BRUCE LEHMAN

Attesting Officer

Commissioner of Patents and Trademarks